(12) United States Patent
Butler et al.

(10) Patent No.: US 7,565,471 B2
(45) Date of Patent: Jul. 21, 2009

(54) MESSAGE SIGNALED INTERRUPT EXTENDED (MSI-X) AUTO CLEAR AND FAILSAFE LOCK

(75) Inventors: Jim Donald Butler, Costa Mesa, CA (US); Michael Scully Jordan, Costa Mesa, CA (US); Joe Chung-Ping Tien, Costa Mesa, CA (US); David James Duckman, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 16 days.

(21) Appl. No.: 11/228,862

(22) Filed: Sep. 16, 2005

(65) Prior Publication Data

US 2007/0067534 A1 Mar. 22, 2007

(51) Int. Cl.
*G06F 13/24* (2006.01)
*G06F 12/00* (2006.01)

(52) U.S. Cl. ...................... 710/260; 707/204
(58) Field of Classification Search .................. 710/260; 707/204
See application file for complete search history.

(56) References Cited

U.S. PATENT DOCUMENTS

| | | | | |
|---|---|---|---|---|
| 5,708,813 A * | 1/1998 | Cho et al. | | 710/260 |
| 5,864,701 A * | 1/1999 | Col et al. | | 710/260 |
| 5,954,806 A * | 9/1999 | Ellis et al. | | 710/62 |
| 6,021,458 A * | 2/2000 | Jayakumar et al. | | 710/266 |
| 6,219,720 B1 * | 4/2001 | Klein | | 710/1 |
| 6,629,179 B1 * | 9/2003 | Bashford | | 710/260 |
| 6,941,398 B2 * | 9/2005 | Lai et al. | | 710/260 |
| 6,981,074 B2 * | 12/2005 | Oner et al. | | 710/32 |
| 7,003,615 B2 * | 2/2006 | Chui et al. | | 710/311 |
| 7,051,145 B2 * | 5/2006 | Butler et al. | | 710/305 |
| 7,257,658 B2 * | 8/2007 | Winkler et al. | | 710/266 |
| 7,315,911 B2 * | 1/2008 | Davies et al. | | 710/260 |
| 7,321,945 B2 * | 1/2008 | Kataoka | | 710/260 |
| 7,370,133 B2 * | 5/2008 | Iyer et al. | | 710/310 |
| 7,404,044 B2 * | 7/2008 | Moll | | 711/141 |
| 7,415,555 B2 * | 8/2008 | Arataki | | 710/110 |
| 2003/0182484 A1 * | 9/2003 | Gaur et al. | | 710/260 |
| 2004/0225790 A1 * | 11/2004 | George et al. | | 710/260 |
| 2005/0228922 A1 * | 10/2005 | Tsao et al. | | 710/268 |
| 2005/0289271 A1 * | 12/2005 | Martinez et al. | | 710/260 |
| 2006/0253849 A1 * | 11/2006 | Avram et al. | | 717/172 |

* cited by examiner

*Primary Examiner*—Khanh Dang
*Assistant Examiner*—Christopher A Daley
(74) *Attorney, Agent, or Firm*—Morrison & Foerster LLP

(57) ABSTRACT

A method and apparatus is disclosed for improving the MSI and MSI-X specifications by implementing an efficient delivery and clearing mechanism for interrupt conditions to increase performance between the driver and hardware/firmware interface while ensuring that no interrupts are lost in the process. In particular, an auto clear function is employed to eliminate the need for drivers in the host to send writes over the PCI-based bus to deassert and assert attention enable register bits and clear down attention register bits, and a fail safe mechanism is utilized to prevent lost interrupts.

15 Claims, 3 Drawing Sheets

MESSAGE SIGNALED INTERRUPT EXTENDED (MSI-X) AUTO CLEAR AND FAILSAFE LOCK

FIELD OF THE INVENTION

This invention relates to the handling of interrupts, and more particularly, to automatically clearing attention registers and providing a fail safe lock for improved handling of interrupts in Message Signaled Interrupt (MSI)-enabled systems.

BACKGROUND OF THE INVENTION

In conventional interrupt architectures, the interrupt delivery mechanism can create a high latency event. Interrupt pins are usually shared between multiple devices, leading to an ambiguity as to the originating source of an interrupt appearing on the shared interrupt pin. This ambiguity makes it necessary for the individual device drivers to read their associated devices over a Peripheral Component Interconnect (PCI) bus to determine if the interrupt was generated by the device, and if so, what caused the interrupt.

FIG. 1 illustrates a conventional server or computer 100 with interrupt handling capability. In FIG. 1, the server 100 includes a host 102, which includes a processor 138 and firmware 140. The firmware 140 contains instructions executable by the processor 138 for implementing an Operating System (OS) 104, one or more drivers 106, and an interrupt controller 108. The interrupt controller 108 may be connected to a PCI bus 110, a PCI-eXtended (PCI-X) bus 112 or a PCI Express bus 114 (collectively "a PCI-based bus") through a host bridge 128.

Coupled to the PCI-based bus are n+1 Host Bus Adapters (HBAs) 116, each HBA for enabling communications between devices coupled to the PCI-based bus and an external network 118 such as a Storage Area Network (SAN) over a link 120 such as a Fibre Channel (FC) link. Note that there is one driver 106 in host 102 for every HBA 116 coupled to the PCI-based bus. The HBAs 116 are configured by firmware 160 to provide an interface between the host 102 and the network 118.

The HBAs 116 may support multiple channels and one or more protocols (e.g. FC, Serial Attached Small computer system interconnect (SAS), Serial Advanced Technology Attachment (SATA) or the like). Each channel on the HBA 116 may utilize a SERializer/DESerializer (SERDES) 142 and a protocol core ENGine (ENG) 144 coupled to the SERDES 142 for communicating over the network 118. A Bus Interface Unit (BIU) 146 couples one or more ENGs 144 to Random Access Memory (RAM) 148 and to one or more processors 150 and provides an interface to an internal bus 152. Also connected to the internal bus 152 is an Address Translation Unit (ATU) or host interface 154 for interfacing between the internal bus 152 and the PCI-based bus.

The HBAs 116 process attention conditions and generate interrupts using firmware 160 and interrupt logic 156 located in the BIU 146. Each HBA 116 may experience a number of different conditions known as attention conditions, each of which may create a different type of interrupt. Interrupts are HBA-specific notifications sent to the HBA's associated device driver 106 to indicate that particular events have occurred. In the example of FIG. 1, the interrupt logic 156 in HBA0 116 includes an attention register 122 containing m+1 (e.g. 32) attention bits (e.g. ATT0-ATTm), each representing a different type of attention condition, and a conditions register 126. When an attention condition is experienced from within an HBA 116, the appropriate attention bit for that attention condition is asserted in the attention register 122, and the conditions register 126 is updated with information indicating what caused the attention condition. An interrupt must thereafter be passed up to the host 102 so that the interrupt can be processed by the driver 106 associated with that HBA 116.

In servers 100 utilizing a PCI bus 110 or a PCI-X bus 112, a single shared interrupt bit in the PCI or PCI-X bus is asserted whenever an attention bit is asserted in the attention register 122 in any of the HBAs 116, and this bit is passed up to the interrupt controller 108. However, because the interrupt bit is shared, the asserted interrupt bit provides no indication to the interrupt controller 108 as to which HBA 116 generated the interrupt. In servers 100 utilizing a PCI Express bus 114 (a serial bus), a serial interrupt message is generated and passed up to the interrupt controller 108. Again, the interrupt message also provides no indication to the interrupt controller as to which HBA 116 generated the interrupt.

Because the interrupt bit or message provides no indication as to which HBA 116 generated the interrupt, the interrupt controller 108 forwards the interrupt bit or message to all of the drivers 106 in the host 102. Each driver 106 must then separately query its associated HBA 116 and read the attention register 122 and the conditions register 126 to determine if that HBA generated the interrupt, and if so, what caused the interrupt. Of course, only one of the drivers 106 will determine that its associated HBA 116 generated the interrupt, but the additional traffic generated by the queries from the other drivers leads to the consumption of costly processor cycles and increased traffic on the PCI-based bus. After the driver 106 whose associated HBA 116 generated the interrupt is identified, and the asserted attention bits that generated the interrupt are identified, the driver can the process the interrupt.

While the current interrupt bit or message is being processed by the appropriate driver, it is possible for the HBA 116 to experience a new attention condition and assert a corresponding attention bit in the attention register 122 that would normally cause the same interrupt bit or message to be generated again. However, because the interrupt bit or message currently being processed by the driver will not contain any information about this newly asserted attention bit 122, the new attention condition will not be processed by the driver. When the attention bits that caused the current interrupt bit or message to be generated are subsequently cleared when processing of the current interrupt bit or message is completed, the newly asserted attention bit will remain asserted. However, in some implementations, the newly asserted attention bit will not cause a new interrupt to be sent, and the new attention condition will effectively have been lost.

To avoid losing attention conditions in the manner described above, an attention enable register 124 may be employed in each HBA 116. There is one attention enable bit (e.g. one of ATTENB0-ATTENBm) for every attention bit in the attention register 122. In systems utilizing attention enable registers 124, after the driver 106 whose associated HBA 116 generated the interrupt bit or message is identified, and the asserted attention bits that caused the interrupt are identified, the driver commences processing of the interrupt bit or message by sending a write command to the attention enable register 124 to deassert (i.e. disable) the attention enable bits associated with all of attention bits in the attention register 122 that could have caused the interrupt message to be generated. Once an attention enable bit is deasserted, if the HBA experiences an attention condition associated with that attention enable bit and asserts the appropriate bit in the attention register 112, no interrupt corresponding to that attention enable bit will be immediately generated. When the processing of the current interrupt has been completed, the driver 106 processing the interrupt acknowledges the interrupt by sending a write command to the HBA 116 to clear down (deassert) all previously identified attention bits in the attention register 122. Note, however, that the newly asserted attention bit will not be deasserted. The driver 106 also sends another write command to the attention enable register 124 to assert (enable) the previously deasserted (disabled) attention enable bits in the attention enable register. When the attention enable bits are asserted again, the newly asserted attention bit will then generate a new interrupt bit or message. The net result is that the attention condition that caused the newly asserted attention bit will be processed as a result of the new interrupt, and will not be lost. However, these additional write commands also lead to increased traffic on the PCI-based bus and consumption of costly processor cycles.

MSI, as described in the PCI Local Bus Specification Revision 3.0, incorporated herein by reference, is an optional feature for PCI devices and required for PCI-X devices. MSI-eXtended (MSI-X, also defined in PCI Local Bus Specification Revision 3.0) is an optional extension to MSI. In either MSI or MSI-X, an MSI engine 160 within each HBA 116 composes and sends an in-band memory write message containing information identifying the HBA that generated the interrupt, and also what caused the interrupt. The write message is received by the interrupt controller 108 and stored in host memory in a location configured by the OS 104 and the drivers 106. The interrupt controller 108 is able to read the write message and forward it only to the driver 106 associated with the HBA 116 that generated the interrupt. This write message therefore eliminates the need for each driver 106 to query its associated HBA 116 to determine if that HBA generated the interrupt, and to determine which attention bits were asserted, thereby reducing bus traffic and improving the processing efficiency of the server 100. However, use of the MSI and MSI-X feature does not eliminate the multiple write commands necessary to deassert the attention enable bits in the attention enable register 124, clear down the attention register 122, and re-assert the attention enable bits in the attention enable register in order to avoid losing interrupts.

Therefore, there is a need to eliminate the need for drivers to send write commands to the HBAs during the processing of interrupts while still ensuring that no interrupts are lost.

SUMMARY OF THE INVENTION

Embodiments of the present invention are directed to improving the MSI and MSI-X specifications by implementing an efficient delivery and clearing mechanism for attention conditions to increase performance between the driver and hardware/firmware interface while ensuring that no attention conditions are lost in the process. In particular, an auto clear function is employed to eliminate the need for drivers in the host to send writes over the PCI-based bus to deassert and assert attention enable register bits and clear down attention register bits, and a fail safe mechanism is utilized to prevent lost attention conditions.

An HBA in a server with enhanced MSI interrupt handling capabilities may experience a number of different conditions referred to herein as attention conditions, and generate different types of interrupts. The HBA includes an attention register containing m+1 attention bits (e.g. ATT0-ATTm), each representing a different attention condition, and a conditions register. When an attention condition is experienced within the HBA, the appropriate attention bit for that attention condition is asserted in the attention register, and the conditions register is updated with information indicating what caused the attention condition.

An interrupt message must thereafter be passed up to the host so that the attention conditions can be processed. The HBA includes an interrupt message table containing p+1 interrupt messages (e.g. MSG0-MSGp), where p is less than or equal to m. Each interrupt message is comprised of an address field and a data field. The address field contains the address in host memory and identifies the destination of the interrupt message, while the data field indicates to a driver in the host that one or more attention bits in the attention register have been asserted.

Associated with the attention register is an MSI map, which includes m+1 MSIMAP registers (e.g. MSIMAP0-MSIMAPm), one for each attention bit in the attention register. Each MSIMAP register specifies the particular interrupt message (e.g. one of MSG0-MSGp) that will indicate that its associated attention bit has been asserted.

When an attention condition is experienced in the HBA and a particular attention bit is asserted in the attention register, message logic utilizes the corresponding MSIMAP register in the MSIMAP to determine which interrupt message will be sent out over the PCI-based bus. When the interrupt message is sent out over the PCI-based bus, it is received by the interrupt controller, which then forwards the interrupt message to the driver associated with the HBA that sent the interrupt message.

Meanwhile, as soon as the hardware in the HBA confirms that an interrupt message has been sent out over the PCI-based bus (i.e. by confirming that it has been passed to the PCI layer), the message logic in the HBA automatically clears down the attention bits in the attention register corresponding to the transmitted interrupt message. No further interaction between the driver and the attention register is necessary because the appropriate bits in the attention register have been automatically cleared down and are now armed and ready for the next attention condition. In keeping with the fail-safe feature of the design, only those attention bits for which interrupt messages are successfully delivered (sent out over the PCI-based bus) will be cleared. With this feature, there is no need to send writes across the PCI-based bus to deassert and assert an attention enable register and clear down the attention register.

To perform the auto clear function, a reverse interrupt message-to-attention lookup must be performed. When an interrupt message has been confirmed to have been sent out over the PCI-based bus, the message logic examines each MSIMAP register in the MSIMAP to determine the attention bit associated with the message that has just been sent. The associated attention bit in the attention register is then deasserted.

For those attention bits that do not use auto clear, a fail safe mechanism is employed to prevent lost attention conditions. As mentioned above, while the current interrupt message is being processed by a driver, it is possible for the HBA to experience other attention conditions and set other attention bits represented in the current interrupt message. With the fail safe mechanism, even though the current interrupt message was already sent out, and even though auto clear is not enabled, these other attention conditions will cause subsequent interrupt messages to be sent out, and as a result these other attention conditions will not be lost.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

In particular, although HBAs are described herein for purposes of illustration and explanation, it should be understood that other bus adapters, Input/Output Controllers (IOCs), and devices capable of generating interrupts and communicating those interrupts to a host over a PCI-based bus fall within the scope of the present invention.

Embodiments of the present invention represent an improvement to the MSI and MSI-X specifications by implementing an efficient delivery and clearing mechanism of interrupt conditions to increase performance between the driver and hardware/firmware interface while ensuring that no interrupts are lost in the process. In particular, embodiments of the present invention employ an auto clear function to eliminate the need for drivers in the host to send writes over the PCI-based bus to deassert and assert attention enable register bits and clear down attention register bits, and employ a fail safe mechanism to prevent lost interrupts.

Figure 1:
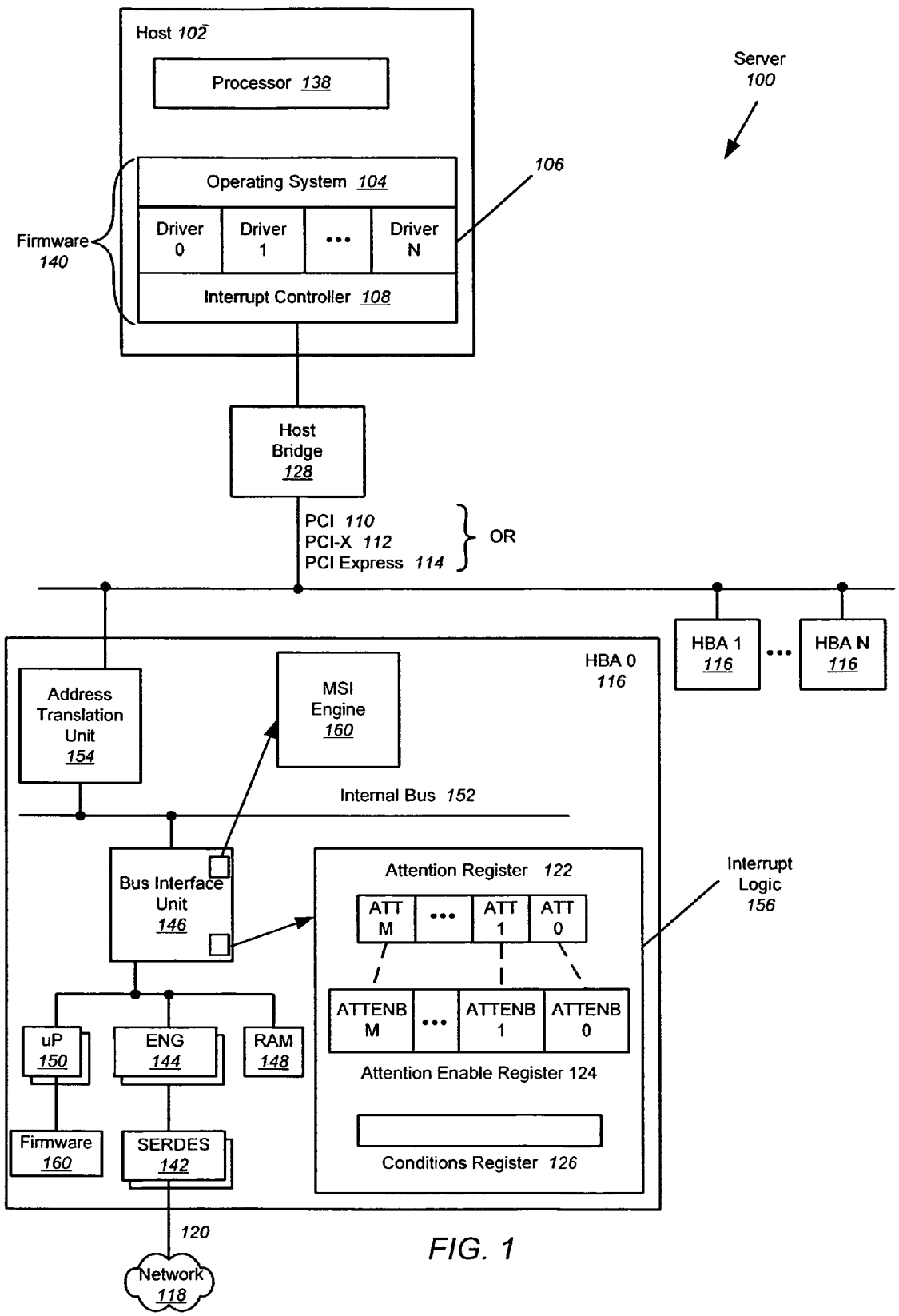
FIG. 1 is a block diagram of an exemplary conventional server or computer with interrupt handling capability.
Figure 2:
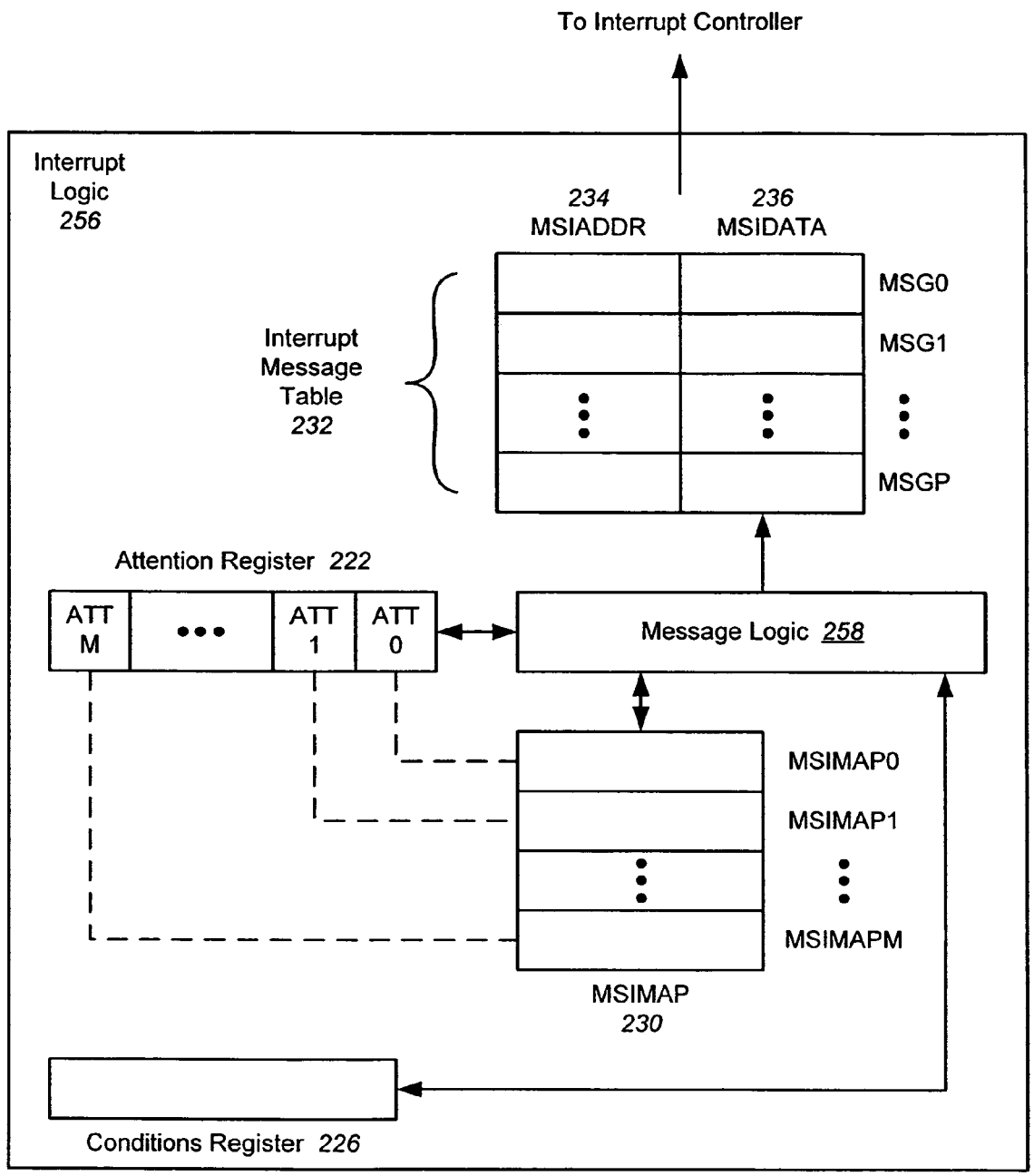
FIG. 2 is a block diagram of interrupt logic with enhanced MSI interrupt handling capabilities according to embodiments of the present invention.

FIG. 2 illustrates interrupt logic 256 within an HBA with enhanced MSI interrupt handling capabilities in a server similar to that shown FIG. 1 according to embodiments of the present invention. The HBA processes attention conditions using firmware and interrupt logic 256. As previously discussed, each HBA may experience a number of different conditions known as attention conditions. In the example of FIG. 2, the interrupt logic 256 within an HBA includes an attention register 222 containing m+1 attention indicators or bits (e.g. ATT0-ATTm), each representing a different type of attention condition, and a conditions register 226. When the HBA experiences an attention condition, the appropriate attention bit for that attention condition is asserted in the attention register 222, and the conditions register 226 is updated with information indicating what caused the attention condition. A notification of the attention condition in the form of an interrupt message must thereafter be passed up to the host so that the interrupt can be processed. It should be understood that in PCI Express embodiments, the interrupt message is a serial message, but in PCI or PCI-X embodiments, the interrupt message is a parallel message.

The interrupt logic according to embodiments of the present invention includes an interrupt message table 232 stored in memory within the HBA. The interrupt message table 232 contains p+1 interrupt messages (e.g. MSG0-MSGp), where p is less than or equal to m. Each interrupt message is comprised of an address field 234 and a data field 236. The number of bits in the interrupt message is defined in the MSI and MSI-X specifications. The address field 234 contains the address in host memory and identifies the destination of the interrupt message, while the data field 236 indicates to a driver in the host that one or more attention bits in the attention register 222 have been asserted. In one example, the number of interrupt messages is equal to the number of attention bits, and one attention bit is associated with one interrupt message. In another example, there is only one interrupt message, and all attention bits are associated with that one interrupt message. Other intermediate cases are also possible. In one example described herein for purposes of illustration only, MSG1 may be an interrupt message whose data field 236 indicates to the driver that one or more of attention bits ATT0, ATT1 and ATT4 have been asserted (indicating that an attention condition associated with one or more of attention bits ATT0, ATT1 and ATT4 has been generated), while MSG2 may be an interrupt message whose data field indicates to the driver that one or more of attention bits ATT2 and ATT3 have been asserted (indicating that an attention condition associated with one or more of attention bits ATT2 and ATT3 has been generated).

Associated with the attention register 222 is an MSI map 230 according to embodiments of the present invention. The MSI map 230 includes m+1 MSIMAP registers (e.g. MSIMAP0-MSIMAP31), one for each attention bit in the attention register 222. Each MSIMAP register may contain multiple bits (e.g. 8 bits) and specifies the particular interrupt message (e.g. one of MSG0-MSGp) that will indicate that its associated attention bit has been asserted. Continuing the previous example, if attention bit ATT0 in attention register 222 is associated with MSIMAP0 in MSIMAP 230, then MSIMAP0 specifies MSG1 in message table 232, because MSG1 is the interrupt message that indicates to the driver associated with HBA0 that attention bit ATT0 has been asserted. In addition, if attention bit ATT3 in attention register 222 is associated with MSIMAP3 in MSIMAP 230, then MSIMAP3 specifies MSG2 in message table 232, because MSG2 is the interrupt message that indicates to the driver associated with HBA0 that attention bit ATT3 has been asserted.

It should be understood that the device drivers in the host and the firmware in the HBAs negotiate the number and format of each interrupt message in the interrupt message table 232 during initialization. A register in the HBA may advertise or indicate how many interrupt messages can be supported by the HBA. Although the HBAs may be able to handle a relatively large number of interrupt messages in which each interrupt message represents relatively few attention conditions, the host may indicate during initialization of the HBA that the host supports fewer interrupt messages. In such an instance, the host would write to another register in the HBA indicating how many interrupt messages will actually be used, and the HBA would then be configured to send only a few interrupt messages, but each interrupt message would represent more attention conditions. For example, although the HBA may advertise that it supports a certain number of interrupt messages, during initialization the driver may send a request to its associated HBA, asking that fewer interrupt messages be sent, each representing more attention conditions. The driver would specify each of the interrupt messages and the format for each message.

The PCI standards do not define a protocol for associating particular interrupt conditions in the PCI device function with particular MSI or MSI-X messages. Embodiments of the present invention employ a Service Level Interface (SLI) mailbox command to associate interrupt conditions with messages. An additional SLI mailbox command allows providing MSI-X messages (with distinct addresses) in a hardware environment that does not support MSI-X directly.

In embodiments of the present invention, the host uses a CONFIG_MSI command to associate specific attention conditions in the HBA with MSI or MSI-X messages. The primary basis of the association is the bit position in the Host Attention Register (HAR) that reports a condition. Because additional interrupt condition sources may exist, a small set of secondary associations is also available. For configuration purposes the only difference between MSI and MSI-X is the number of distinct messages that can be selected. In order to avoid the need for an additional mailbox command definition, a control parameter allows the host to use this command either to configure associations or to request that the HBA report the currently configured associations. When using the command to configure associations, the host can specify a complete set or a partial set to be added to existing associations.

The inputs to the CONFIG_MSI command include (1) a CONFIG_MSI command code, (2) control parameters for reporting or adding, (3) a bit mask of host attention conditions, (4) an optional list of secondary conditions, and (5) an array of associated message numbers. The format of the mailbox input and the response information is shown in the following CONFIG_MSI mailbox command format table and word description table.

| Field | Description |
| --- | --- |
| | CONFIG MSI Word Description Table |
| Word 1 Bits (31:16) | Default Message Number<br>This field specifies the Message Number to be used to report any enabled interrupt condition that is not explicitly configured to be associated with a particular Message Number. This field is only valid when the D (Default Present) field is set to 1 (Word 1, bit 2). |
| Word 1 Bits (15:13) | Reserved<br>This field must be cleared (set to 0). |
| Word 1 Bits (12:8) | Number of Attention IDs (NID)<br>The SLI-Host specifies or the SLI-Port reports the number of secondary Attention IDs that are valid in Words 3 to 6. |
| Word 1 Bits (7:3) | Reserved<br>This field must be cleared (set to 0). |
| Word 1 Bit (2) | Default Present (D)<br>The state of this bit specifies whether a valid default message number is present in bits 31:16. The SLI-Host sets the bit appropriately when configuring associations. The SLI-Port sets the bit appropriately when reporting configured associations. |
| Word 1 Bit (1) | Add Associations (A)<br>The SLI-Host clears this bit (set to 0) in the command to indicate that the associations specified replace all currently configured associations. The SLI-Host sets this bit (set to 1) to indicate that the specified associations are in addition to previously configured associations. In this case, the attention conditions specified in this command are associated with the specified message numbers instead of any previously configured association and the attention conditions not specified in this command retain the previously configured associations. This bit is not applicable when the SLI-Port is reporting configured associations. |
| Word 1 Bit (0) | Report Associations (R)<br>The SLI-Host clears this bit (set to 0) in the command to indicate that the command is configuring associations. The SLI-Host sets this bit (set to 1) to request that the SLI-Port report currently configured associations in the response. |
| Word 2 Bits (31:0) | Host Attention Conditions<br>This word is considered to have the same format as the currently configured SLI Host Attention Register. Each bit set (HA31 through HA0) indicates that a valid message number is specified in the associated Message Number field. The SLI-Host sets bits appropriately when configuring associations. The SLI-Port sets bits appropriately when reporting associations. |

-continued

CONFIG MSI Word Description Table

| Field | Description |
|---|---|
| Word 3 Bits (31:24) | Attention ID 0<br>When the NID field is greater than zero, this field contains an ID code to specify a secondary interrupt source that is associated with the Message Number in Word 23, bits 31:16. |
| Word 3 Bits (23:16) | Attention ID 1<br>When the NID field is greater than one, this field contains an ID code to specify a secondary interrupt source that is associated with the Message Number in Word 23, bits 15:0. |
| Word 3 Bits (15:8) | Attention ID 2<br>When the NID field is greater than two, this field contains an ID code to specify a secondary interrupt source that is associated with the Message Number in Word 24, bits 31:16. |
| Word 3 Bits (7:0) | Attention ID 3<br>When the NID field is greater than 3, this field contains an ID code to specify a secondary interrupt source that is associated with the Message Number in Word 24, bits 15:0. |
| Word 4 Bits (31:24) | Attention ID 4<br>When the NID field is greater than four, this field contains an ID code to specify a secondary interrupt source that is associated with the Message Number in Word 25, bits 31:16. |
| Word 4 Bits (23:16) | Attention ID 5<br>When the NID field is greater than five, this field contains an ID code to specify a secondary interrupt source that is associated with the Message Number in Word 25, bits 15:0. |
| Word 4 Bits (15:8) | Attention ID 6<br>When the NID field is greater than six, this field contains an ID code to specify a secondary interrupt source that is associated with the Message Number in Word 26, bits 31:16. |
| Word 4 Bits (7:0) | Attention ID 7<br>When the NID field is greater than seven, this field contains an ID code to specify a secondary interrupt source that is associated with the Message Number in Word 26, bits 15:0. |
| Word 5 Bits (31:24) | Attention ID 8<br>When the NID field is greater than eight, this field contains an ID code to specify a secondary interrupt source that is associated with the Message Number in Word 27, bits 31:16. |
| Word 5 Bits (23:16) | Attention ID 9<br>When the NID field is greater than nine, this field contains an ID code to specify a secondary interrupt source that is associated with the Message Number in Word 27, bits 15:0. |
| Word 5 Bits (15:8) | Attention ID 10<br>When the NID field is greater than ten, this field contains an ID code to specify a secondary interrupt source that is associated with the Message Number in Word 28, bits 31:16. |
| Word 5 Bits (7:0) | Attention ID 11<br>When the NID field is greater than eleven, this field contains an ID code to specify a secondary interrupt source that is associated with the Message Number in Word 28, bits 15:0. |
| Word 6 Bits (31:24) | Attention ID 12<br>When the NID field is greater than twelve, this field contains an ID code to specify a secondary interrupt source that is associated with the Message Number in Word 29, bits 31:16. |
| Word 6 Bits (23:16) | Attention ID 13<br>When the NID field is greater than thirteen, this field contains an ID code to specify a secondary interrupt source that is associated with the Message Number in Word 29, bits 15:0. |
| Word 6 Bits (15:8) | Attention ID 14<br>When the NID field is greater than fourteen, this field contains an ID code to specify a secondary interrupt source that is associated with the Message Number in Word 30, bits 31:16. |
| Word 6 Bits (7:0) | Attention ID 15<br>When the NID field is sixteen, this field contains an ID code to specify a secondary interrupt source that is associated with the Message Number in Word 30, bits 15:0. |

-continued

CONFIG MSI Word Description Table

| Field | Description |
|---|---|
| Word 7 Bits (31:16) | Message Number for Host Attention Bit 0<br>When bit 0 of the Host Attention Conditions word is set, this field configures or reports the Message Number associated with the attention condition. |
| Word 7 Bits (15:0) | Message Number for Host Attention Bit 1<br>When bit 1 of the Host Attention Conditions word is set, this field configures or reports the Message Number associated with the attention condition. |
| Word 8:21 | Bits (31:16) Message Number for Host Attention Bit [even number]<br>When bit [even number] of the Host Attention Conditions word is set, this field configures or reports the Message Number associated with the attention condition. |
| Word 8:21 | Bits (15:0) Message Number for Host Attention Bit [odd number]<br>When bit [odd number] of the Host Attention Conditions word is set, this field configures or reports the Message Number associated with the attention condition. |
| Word 22 Bits (31:16) | Message Number for Host Attention Bit 30<br>When bit 30 of the Host Attention Conditions word is set, this field configures or reports the Message Number associated with the attention condition. |
| Word 22 Bits (15:0) | Message Number for Host Attention Bit 31<br>When bit 31 of the Host Attention Conditions word is set, this field configures or reports the Message Number associated with the attention condition. |
| Word 23 Bits (31:16) | Message Number for Attention ID 0<br>When the NID field is greater than 0, this field configures or reports the Message Number associated with the attention condition selected by the code in Attention ID 0. |
| Word 23 Bits (15:0) | Message Number for Attention ID 1<br>When the NID field is greater than 1, this field configures or reports the Message Number associated with the attention condition selected by the code in Attention ID 1. |
| Word 24 Bits (31:16) | Message Number for Attention ID 2<br>When the NID field is greater than 2, this field configures or reports the Message Number associated with the attention condition selected by the code in Attention ID 2. |
| Word 24 Bits (15:0) | Message Number for Attention ID 3<br>When the NID field is greater than 3, this field configures or reports the Message Number associated with the attention condition selected by the code in Attention ID 3. |
| Word 25 Bits (31:16) | Message Number for Attention ID 4<br>When the NID field is greater than 4, this field configures or reports the Message Number associated with the attention condition selected by the code in Attention ID 4. |
| Word 25 Bits (15:0) | Message Number for Attention ID 5<br>When the NID field is greater than 5, this field configures or reports the Message Number associated with the attention condition selected by the code in Attention ID 5. |
| Word 26 Bits (31:16) | Message Number for Attention ID 6<br>When the NID field is greater than 6, this field configures or reports the Message Number associated with the attention condition selected by the code in Attention ID 6. |
| Word 26 Bits (15:0) | Message Number for Attention ID 7<br>When the NID field is greater than 7, this field configures or reports the Message Number associated with the attention condition selected by the code in Attention ID 7. |
| Word 27 Bits (31:16) | Message Number for Attention ID 8<br>When the NID field is greater than 8, this field configures or reports the Message Number associated with the attention condition selected by the code in Attention ID 8. |
| Word 27 Bits (15:0) | Message Number for Attention ID 9<br>When the NID field is greater than 9, this field configures or reports the Message Number associated with the attention condition selected by the code in Attention ID 9. |
| Word 28 Bits (31:16) | Message Number for Attention ID 10<br>When the NID field is greater than 10, this field configures or reports the Message Number associated with the attention condition selected by the code in Attention ID 10. |
| Word 28 Bits (15:0) | Message Number for Attention ID 11<br>When the NID field is greater than 11, this field configures or reports the Message Number associated with the attention condition selected by the code in Attention ID 11. |

CONFIG MSI Word Description Table

| Field | Description |
|---|---|
| Word 29 Bits (31:16) | Message Number for Attention ID 12<br>When the NID field is greater than 12, this field configures or reports the Message Number associated with the attention condition selected by the code in Attention ID 12. |
| Word 29 Bits (15:0) | Message Number for Attention ID 13<br>When the NID field is greater than 13, this field configures or reports the Message Number associated with the attention condition selected by the code in Attention ID 13. |
| Word 30 Bits (31:16) | Message Number for Attention ID 14<br>When the NID field is greater than 14, this field configures or reports the Message Number associated with the attention condition selected by the code in Attention ID 14. |
| Word 30 Bits (15:0) | Message Number for Attention ID 15<br>When the NID field is 16, this field configures or reports the Message Number associated with the attention condition selected by the code in Attention ID 15. |
| Word 31 Bits (31:0) | Reserved |

CONFIG_MSI Mailbox Command Format

| | 31 | | 16 | 15 | | 8 | 7 | 2 | 1 | 0 |
|---|---|---|---|---|---|---|---|---|---|---|
| Word 0 | R: Status (0 = success) | | | C: Command (CONFIG_MSI = 0 x TBD) | | | | | H C | O C |
| Word 1 | Default Message Number | | | Reserved | NID | | Reserved (7:3) | | D A | C: A | C: R |
| Word 2 | Host Attention Conditions - HA31:HA0 | | | | | | | | | |
| Word 3 | Attention ID 0 | | Attention ID 1 | | | Attention ID 2 | | Attention ID 3 | | |
| Word 4 | Attention ID 4 | | Attention ID 5 | | | Attention ID 6 | | Attention ID 7 | | |
| Word 5 | Attention ID 8 | | Attention ID 9 | | | Attention ID 10 | | Attention ID 11 | | |
| Word 6 | Attention ID 12 | | Attention ID 13 | | | Attention ID 14 | | Attention ID 15 | | |
| Word 7 | Message Number for HA 0 | | | | | Message Number for HA 1 | | | | |
| Word 8 | Message Number for HA 2 | | | | | Message Number for HA 3 | | | | |
| Word 9 | Message Number for HA 4 | | | | | Message Number for HA 5 | | | | |
| Word 10 | Message Number for HA 6 | | | | | Message Number for HA 7 | | | | |
| Word 11 | Message Number for HA 8 | | | | | Message Number for HA 9 | | | | |
| Word 12 | Message Number for HA 10 | | | | | Message Number for HA 11 | | | | |
| Word 13 | Message Number for HA 12 | | | | | Message Number for HA 13 | | | | |
| Word 14 | Message Number for HA 14 | | | | | Message Number for HA 15 | | | | |
| Word 15 | Message Number for HA 16 | | | | | Message Number for HA 17 | | | | |
| Word 16 | Message Number for HA 18 | | | | | Message Number for HA 19 | | | | |
| Word 17 | Message Number for HA 20 | | | | | Message Number for HA 21 | | | | |
| Word 18 | Message Number for HA 22 | | | | | Message Number for HA 23 | | | | |
| Word 19 | Message Number for HA 24 | | | | | Message Number for HA 25 | | | | |
| Word 20 | Message Number for HA 26 | | | | | Message Number for HA 27 | | | | |
| Word 21 | Message Number for HA 28 | | | | | Message Number for HA 29 | | | | |
| Word 22 | Message Number for HA 30 | | | | | Message Number for HA 31 | | | | |
| Word 23 | Message number for Attention ID 0 | | | | | Message number for Attention ID 1 | | | | |
| Word 24 | Message number for Attention ID 2 | | | | | Message number for Attention ID 3 | | | | |
| Word 25 | Message number for Attention ID 4 | | | | | Message number for Attention ID 5 | | | | |
| Word 26 | Message number for Attention ID 6 | | | | | Message number for Attention ID 7 | | | | |
| Word 27 | Message number for Attention ID 8 | | | | | Message number for Attention ID 9 | | | | |
| Word 28 | Message number for Attention ID 10 | | | | | Message number for Attention ID 11 | | | | |
| Word 29 | Message number for Attention ID 12 | | | | | Message number for Attention ID 13 | | | | |
| Word 30 | Message number for Attention ID 14 | | | | | Message number for Attention ID 15 | | | | |
| Word 31 | Reserved (31:0) | | | | | | | | | |

Legend:
C: = Command field
R: = Response field

When an attention condition is experienced in HBA 216 and a particular attention bit (e.g. ATT0) is asserted in attention register 222, message logic 258 utilizes the corresponding MSIMAP register (e.g. MSIMAP0) in MSIMAP 230 to determine which interrupt message (e.g. MSG1) will be sent out over the PCI-based bus. The message logic 258 will try to send the interrupt message as soon as it is configured, but other activity in the HBA may cause a delay in sending out the interrupt message. During this waiting time, other attention bits associated with the interrupt message may also become asserted. When the interrupt message is finally sent out over the PCI-based bus, it is received by the interrupt controller, which then forwards the interrupt message to the driver associated with the HBA that sent the interrupt message. To accomplish this, the interrupt controller first reads specified bits in the interrupt message that identify it as an interrupt and identifies the HBA that sent the interrupt message. Firmware and hardware in the host then perform a lookup in a table stored in host memory to determine which driver is associated with the HBA that sent the interrupt message. After the proper driver receives the interrupt message, it must still perform reads to the attention register in the appropriate HBA to determine which attention bits were actually asserted. Only then can the driver process the interrupt message.

Figure 3:
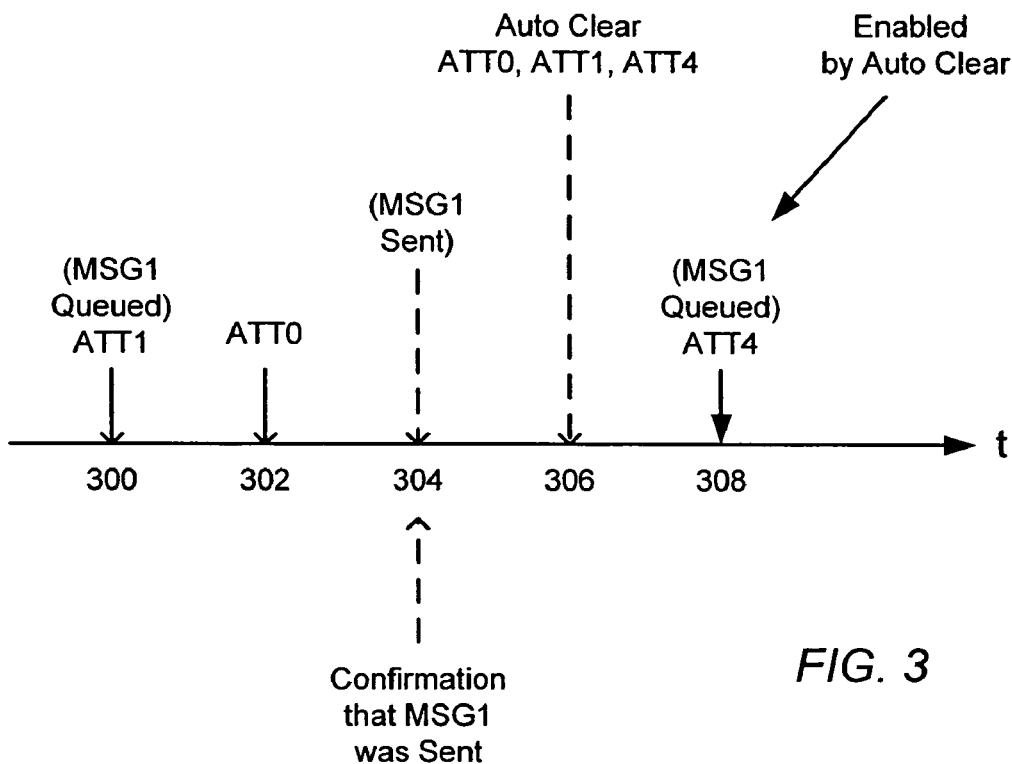
FIG. 3 is an exemplary timeline of interrupt processing using the auto clear feature according to embodiments of the present invention.

Continuing the previous example, and with reference to FIG. 3, if ATT1 is asserted at 300 within HBA0, the message logic will queue up MSG1 for transmission. However, due to other activity, MSG1 may not be sent until time 304. In the meantime, ATT0 is asserted at 302. Therefore, when MSG1 is finally sent at 304, it will indicate that both ATT0 and ATT1 have been asserted. When MSG1 is received by the interrupt controller, MSG1 is forwarded to the driver associated with HBA0. The driver must then examine the attention register to determine if one or more attention bits were actually asserted.

While the current interrupt message is being processed by a driver, it is possible for the HBA to experience other attention conditions and set other attention bits represented in the current interrupt message. Embodiments of the present invention eliminate the need to maintain an attention enable register and perform writes to deassert and re-assert the attention enable bits in the attention enable register in order to avoid losing attention conditions, and indeed eliminate the need for the attention enable register entirely, by providing an auto clear function. Referring again to FIG. 2, as soon as the hardware in the HBA confirms that an interrupt message has been sent out over the PCI-based bus (i.e. by confirming that it has been passed to the PCI layer), message logic 258 automatically clears down the attention bits in the attention register 222 corresponding to the transmitted interrupt message. Note that auto clear assumes that upstream error handling mechanisms will guarantee that the interrupt message will be delivered. No further interaction between the driver and the attention register 222 is necessary because the appropriate bits in the attention register have been automatically cleared down and are now armed and ready for the next attention condition. After auto clear has occurred, any new attention condition will cause the appropriate attention bit to be asserted, which will lead to another interrupt message being generated.

Referring again to FIG. 3 and continuing the previous example, after MSG1 is sent out over the PCI-based bus at 304, a confirmation will occur that MSG1 was actually sent out over the PCI-based bus. If auto clear is enabled for ATT0, ATT1 and ATT4, then shortly after confirmation is received at 304, an auto clear at 306 will clear down ATT0, ATT1 and ATT4. (Note that one or more of these bits must have been asserted.) By doing so, subsequent attention conditions that cause one or more of ATT0, ATT1 and ATT4 to be asserted will not be lost, but will rather be recognized and sent to the interrupt controller using a separate interrupt message. For example, if ATT0 and ATT1 are asserted at 300 and 302, respectively, MSG1 is sent and confirmed at 304 as having been sent out over the PCI-based bus, ATT0, ATT1 and ATT4 are auto-cleared at 306, and ATT4 is subsequently asserted at 308, a new MSG1 will be queued for transmission. With this feature of embodiments of the present invention, there is no need to send writes across the PCI-based bus to deassert and assert an attention enable register and clear down the attention register.

To perform the auto clear function, a reverse interrupt message-to-attention lookup must be performed according to embodiments of the present invention. Referring again to FIG. 2, when an interrupt message has been confirmed to have been sent out over the PCI-based bus, the message logic 258 examines each MSIMAP register in MSIMAP 230 to determine which attention bit/s the sent interrupt corresponds to. If it is, then the associated attention bit in the attention register 222 is deasserted. Continuing the previous example, if MSG1 is confirmed to have been sent out over the PCI-based bus, then each MSIMAP register is examined to determine if MSG1 is identified within that register. In the present example, MSIMAP0, MSIMAP1 and MSIMAP4 will all identify MSG1, and therefore the associated attention bits ATT0, ATT1 and ATT4 will be deasserted.

The combination of reverse interrupt message-to-attention lookup and auto-clear realizes enhancements in both system performance and flexibility in usage. Without auto-clear the driver will need to spend cycles to clear down the appropriate attention register bits. Auto-clear without reverse lookup may adversely limit the mapping and usage of interrupt messages. In embodiments of the present invention, the auto clear function described above is configurable on a per-attention bit basis so that some attention bits may utilize auto clear, while others may not.

For those attention bits that do not use auto clear, a fail safe mechanism is employed to prevent lost interrupts. As mentioned above, while the current interrupt message is being processed by a driver, it is possible for the HBA to generate other attention conditions and set other attention bits represented in the current interrupt message. With the fail safe mechanism, even though the current interrupt message was already sent out, and even though auto clear is not enabled, these other attention conditions will cause subsequent interrupt messages to be sent out, and as a result these other attention conditions will not be lost. This is accomplished by taking a snapshot of the attention register when the current interrupt message is sent out over the PCI-base bus. If a new attention bit is subsequently asserted that is represented by the current interrupt message, a comparison against the snapshot will reveal that the new attention bit was asserted, and a new interrupt message corresponding to the new attention bit will be sent out.

Figure 4:
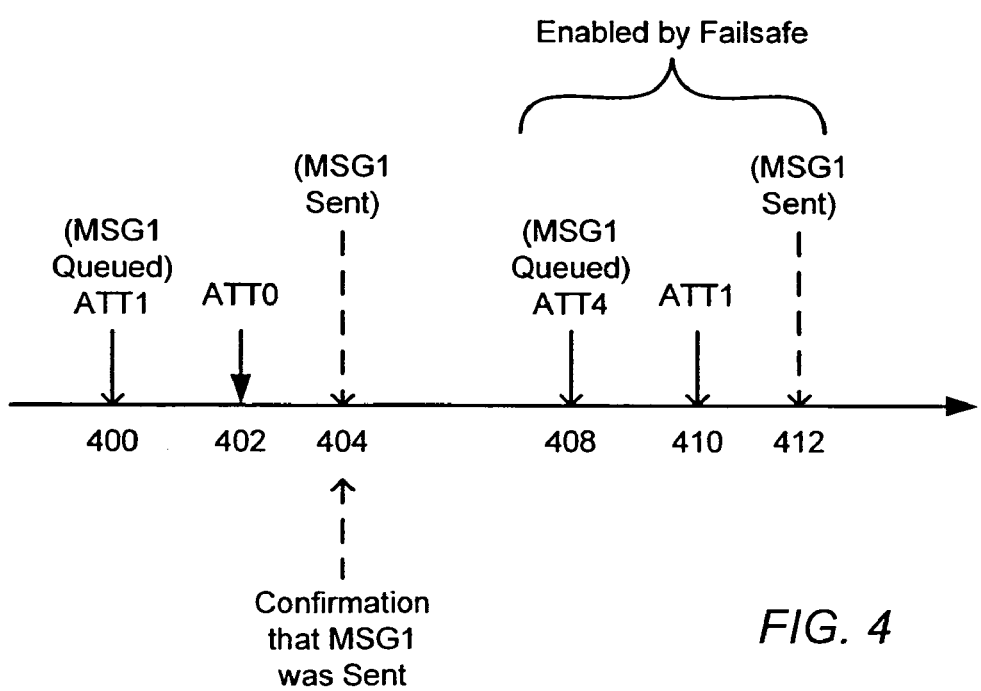
FIG. 4 is an exemplary timeline of interrupt processing using the fail safe feature according to embodiments of the present invention.

Continuing the previous example, and with reference to FIG. 4, if ATT1 is asserted at 400 within HBA0, the message logic will queue up MSG1 for transmission. However, under control of the firmware, MSG1 may not be sent until time 404. In the meantime, ATT0 is asserted at 402. Therefore, when MSG1 is finally sent at 404, it will indicate that both ATT0 and ATT1 have been asserted. When MSG1 is received by the interrupt controller, MSG1 is forwarded to the driver associated with HBA0. The driver must then read the attention register in the HBA to determine the one or more attention bits that were actually asserted. After MSG1 is sent out over the PCI-based bus at 404, a confirmation will occur that MSG1 was actually sent out over the PCI-based bus. If auto clear is not enabled for ATT0, ATT1 and ATT4, then even after confirmation is received at 404, ATT0, ATT1 and ATT4 will not be cleared down. However, with the fail safe feature, subsequent attention conditions that cause one or more of ATT0, ATT1 and ATT4 to be asserted will not be lost, but will rather be recognized and sent to the interrupt controller using a separate interrupt message. For example, if ATT4 is asserted at 408, a new MSG1 will be queued for transmission. Even if an attention condition corresponding to ATT1 is generated at 410, although ATT1 was never cleared down, nevertheless when the new MSG1 is sent at 412, MSG1 will indicate that both ATT1 and ATT4 are asserted.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for processing interrupts within a device capable of generating interrupt messages and communicating the interrupt messages to a host over a Message Signaled Interrupt (MSI) enabled PCI-based bus, comprising:

delivering an interrupt message to the PCI-based bus representing one or more attention conditions;

performing an auto clear from within the device and without involvement of the host to clear down one or more attention indicators for the one or more attention conditions for which auto clear is enabled after confirming that the interrupt message was delivered;

mapping each attention indicator to a map register that specifies an entry in an interrupt message table, said entry in the interrupt message table containing a particular interrupt message representing at least one attention indicator; and utilizing each map register to determine which interrupt message stored in the interrupt message table to deliver to the PCI-based bus when a particular attention indicator is asserted, wherein the auto clear is performed by confirming that an interrupt message was delivered, and responsive to the confirmation, utilizing the map registers to identify which attention indicators are represented by the interrupt message, and which of those attention indicators should be cleared down.

2. The method as recited in claim 1, further comprising:

for attention indicators for which auto clear is not enabled, performing a fail safe operation to ensure that attention conditions experienced in the device after the interrupt message was delivered to the PCI-based bus will result in the delivery of an additional interrupt message to the PCI-based bus.

3. The method as recited in claim 2, further comprising:

taking a snapshot of the attention indicators when delivering the interrupt message to the PCI-based bus; and utilizing the snapshot to identify any newly asserted attention conditions that should result in the delivery of an additional interrupt message to the PCI-based bus.

4. The method as recited in claim 1, further comprising:

negotiating with the host to define a set of interrupt messages that may be delivered to the PCI-based bus and a format of each interrupt message.

5. In a device capable of processing interrupts and including an attention register for storing one or more attention indicators, each attention indicator capable of being asserted when a corresponding attention condition is experienced, a system for improving the processing of interrupts and communicating interrupt messages to a host over a Message Signaled Interrupt (MSI) enabled PCI-based bus, comprising:

one or more processors programmed by firmware and coupled to the attention register for delivering an interrupt message to the PCI-based bus representing one or more attention conditions, and for performing an auto clear from within the device and without involvement of the host to clear down the attention indicators for the one or more attention conditions represented by the interrupt message for which auto clear is enabled after confirming that the interrupt message was delivered;

an interrupt message table communicatively coupled to and configurable by the one or more processors for storing one or more interrupt messages, and a map register corresponding to each attention indicator in the attention register, communicatively coupled to and configurable by the one or more processors for mapping the attention indicator to a particular interrupt message in the interrupt message table representing that attention indicator;

wherein the one or more processors are further programmed for utilizing the map register of a particular attention indicator to determine which interrupt message to deliver to the PCI-based bus when the particular attention indicator is asserted, wherein the auto clear is performed by the one or more processors through confirming an interrupt message was delivered, and responsive to the confirmation, utilizing the map registers to identify which attention indicators are represented by the interrupt message, and which of those attention indicators should be cleared down.

6. The system as recited in claim 5, wherein the one or more processors are further programmed for performing a fail safe operation for attention indicators for which auto clear is not enabled to ensure that interrupts corresponding to the attention indicators for which auto clear is not enabled and generated after the interrupt message was delivered to the PCI-bus will result in the delivery of an additional interrupt message to the PCI-based bus.

7. The system as recited in claim 6, wherein the one or more processors are further programmed for taking a snapshot of the attention indicators when delivering the interrupt message to the PCI-based bus, and utilizing the snapshot to identify any newly asserted attention conditions that should result in the delivery of an additional interrupt message to the PCI-based bus.

8. The system as recited in claim 5, wherein the one or more processors are further programmed for negotiating with the host to define a set of interrupt messages that may be delivered to the PCI-based bus and a format of each interrupt message.

9. A Host Bus Adapter (HBA) comprising the system of claim 5.

10. A server comprising the HBA of claim 9.

11. A Storage Area Network (SAN) comprising the server of claim 10.

12. One or more storage media including a program which, when executed by one or more processors, processes interrupts within a device capable of generating interrupt messages and communicates the interrupt messages to a host over a Message Signaled Interrupt (MSI) enabled PCI-based bus by causing the one or more processors to perform the steps of:

delivering an interrupt message to the PCI-based bus representing one or more attention conditions;

performing an auto clear from within the device and without involvement of the host to clear down one or more attention indicators for the one or more attention conditions for which auto clear is enabled after confirming that the interrupt message was delivered;

mapping each attention indicator to a map register that specifies an entry in an interrupt message table, said entry in the interrupt message table containing a particular interrupt message representing at least one attention indicator; and utilizing each map register to determine which interrupt message stored in the interrupt message table to deliver to the PCI-based bus when a particular attention indicator is asserted, wherein the auto clear is performed by confirming that an interrupt message was delivered, and responsive to the confirmation, utilizing the map registers to identify which attention indicators are represented by the interrupt message, and which of those attention indicators should be cleared down.

13. The one or more storage media as recited in claim 12, wherein the program, when executed by the one or more processors, further causes the one or more processors to perform the step of:

for attention indicators for which auto clear is not enabled, performing a fail safe operation to ensure that attention conditions experienced after the interrupt message was delivered to the PCI-bus will result in the delivery of an additional interrupt message to the PCI-based bus.

14. The one or more storage media as recited in claim 13, wherein the program, when executed by the one or more processors, further causes the one or more processors to perform the steps of:

taking a snapshot of the attention indicators when delivering the interrupt message to the PCI-based bus; and utilizing the snapshot to identify any newly asserted attention conditions that should result in the delivery of an additional interrupt message to the PCI-based bus.

15. The one or more storage media as recited in claim 12, wherein the program, when executed by the one or more processors, further causes the one or more processors to perform the step of:

negotiating with the host to define a set of interrupt messages that may be delivered to the PCI-based bus and a format of each interrupt message.

* * * * *